(12) United States Patent
Kim

(10) Patent No.: US 7,839,808 B2
(45) Date of Patent: Nov. 23, 2010

(54) APPARATUS AND METHOD FOR ELIMINATING NOISE CONTAINED WITHIN USABLE FREQUENCY BAND OF A MOBILE COMMUNICATION TERMINAL

(75) Inventor: Nam-Hyung Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 925 days.

(21) Appl. No.: 11/321,569

(22) Filed: Dec. 29, 2005

(65) Prior Publication Data

US 2006/0146882 A1 Jul. 6, 2006

(30) Foreign Application Priority Data

Dec. 31, 2004 (KR) ...................... 10-2004-0117640

(51) Int. Cl.
*H04B 7/00* (2006.01)
(52) U.S. Cl. .................. 370/310; 370/376; 370/359; 370/521; 370/535; 370/569; 370/384; 370/237; 370/366; 370/320; 370/391; 370/522; 370/387; 375/376; 375/355
(58) Field of Classification Search ................. 370/320, 370/376, 535, 366, 237, 284, 384, 359, 206, 370/521, 369, 391, 522, 395.62; 375/340, 375/240.01, 376, 355
See application file for complete search history.

(56) References Cited

U.S. PATENT DOCUMENTS

| | | | | |
|---|---|---|---|---|
| 4,215,369 A | * | 7/1980 | Iijima | 375/240.01 |
| 4,612,634 A | * | 9/1986 | Bellamy | 370/359 |
| 4,627,046 A | * | 12/1986 | Bellamy | 370/359 |
| 4,644,535 A | * | 2/1987 | Johnson et al. | 370/376 |
| 5,398,241 A | * | 3/1995 | Witchey | 370/391 |
| 6,075,778 A | * | 6/2000 | Sugita | 370/335 |
| 6,785,477 B1 | * | 8/2004 | Masuda et al. | 398/208 |
| 6,904,062 B1 | * | 6/2005 | Tng et al. | 370/537 |
| 6,954,423 B2 | * | 10/2005 | Tinker | 370/208 |
| 7,095,816 B2 | * | 8/2006 | Kishine et al. | 375/355 |
| 7,339,959 B2 | * | 3/2008 | Nio et al. | 370/535 |
| 7,460,156 B2 | * | 12/2008 | Enomoto et al. | 348/211.5 |
| 7,505,298 B2 | * | 3/2009 | Yang et al. | 365/63 |
| 2002/0141515 A1 | * | 10/2002 | Enam et al. | 375/340 |
| 2003/0112828 A1 | * | 6/2003 | Nio et al. | 370/521 |
| 2004/0042387 A1 | * | 3/2004 | Geile | 370/206 |
| 2004/0114585 A1 | * | 6/2004 | Kraemer | 370/366 |
| 2004/0120274 A1 | * | 6/2004 | Petre et al. | 370/320 |
| 2004/0183916 A1 | * | 9/2004 | Enomoto et al. | 348/207.99 |
| 2005/0262492 A1 | * | 11/2005 | Goetting et al. | 717/151 |
| 2008/0256159 A1 | * | 10/2008 | Schwoerer et al. | 708/404 |

* cited by examiner

*Primary Examiner*—Rafael Pérez-Gutiérrez
*Assistant Examiner*—Joseph Arevalo
(74) *Attorney, Agent, or Firm*—The Farrell Law Firm, LLP

(57) ABSTRACT

Disclosed are an apparatus and method for removing noise contained within a usable frequency band of a mobile communication terminal. The apparatus includes a multiplier for multiplying a main clock of the mobile communication terminal by a predetermined integer to generate a reference signal; a multiplexer for multiplexing parallel signals, the parallel signals being transmitted to a peripheral device inside the mobile communication terminal, using the reference signal, and converting the parallel signals into serial signals; a demultiplexer for demultiplexing the serial signals to convert the serial signals into parallel signals; and a frequency divider for recovering the reference signal of the serial signals transmitted from the demultiplexer into the main clock.

4 Claims, 3 Drawing Sheets

APPARATUS AND METHOD FOR ELIMINATING NOISE CONTAINED WITHIN USABLE FREQUENCY BAND OF A MOBILE COMMUNICATION TERMINAL

PRIORITY

This application claims priority under 35 U.S.C. §119 to an application entitled "Apparatus And Method For Eliminating Noise Band Of Usable Frequency Of Mobile Communication Terminal" filed in the Korean Intellectual Property Office on Dec. 31, 2004 and assigned Serial No. 2004-117640, the contents of which are incorporated herein by reference.

BACKGROUND OF THE INVENTION

1. Field of the Invention

The present invention relates to an apparatus and method for eliminating noise contained within a usable frequency band of a mobile communication terminal, and more particularly, to an apparatus and method for eliminating a multiplication signal of a transmission signal, which is recognized as noise when it exists within a usable frequency band of a wireless communication.

2. Description of the Related Art

The use of mobile communication terminals is rapidly increasing because they are handy to carry. With the increasing use of mobile communication terminals, service providers (terminal manufacturers) have made efforts to provide a more stable and reliable call quality and to provide a variety of services so as to attract many users.

In the communication service fields, the elimination of noise from the transmitted or received signals has been studied so as to provide reliable services.

FIG. 1 is a block diagram illustrating transmission of data and control signals between modules in a conventional mobile communication terminal. In a mobile communication terminal shown in FIG. 1, data and control signals are transmitted and received between a Central Processing Unit (CPU) 101 and a peripheral device (for example, a Liquid Crystal Display (LCD) or a camera module) 103 at a constant transfer rate. A transmission waveform of the data and control signals is generally a square wave. Because the square wave consists of a sum of sine waves, there exists harmonic components (hereinafter, referred to as multiplication signals) that are integer multiples of the fundamental frequency.

For example, the mobile communication terminal generally uses a 19.2 MHz main clock. In data transmission, the mobile communication terminal uses 16-stage buses and transmits 2-3 MHz data for one bus. Therefore, harmonics that are integer multiples of the transmission speed are caused.

When the multiplication signals caused by the transmission signal exist within a usable frequency band of the wireless communication, the mobile communication terminal recognizes them as noise.

For example, a frequency band of 869-894 MHz is usable in a Code Division Multiple Access (CDMA) system. Assuming that a transmission speed inside of the mobile communication terminal is 3 MHz during CDMA communication, harmonics that are integer multiples of 3 MHz exist in the communication terminal and the multiplication signals of the transmission signal are contained within the useable frequency band of the CDMA system. Therefore, the mobile communication terminal recognizes the multiplication signals contained within the usable frequency band as noise.

As described above, when the multiplication signals according to the transmission speed inside of the mobile communication terminal exist within the usable frequency band during wireless communication, the mobile communication terminal recognizes the received signal containing the multiplication signals as noise, resulting in degradation in the reception performance of the mobile communication terminal.

SUMMARY OF THE INVENTION

The present invention provides an apparatus and method for eliminating noise contained within a usable frequency band of a mobile communication terminal.

Also, the present invention provides an apparatus and method for eliminating multiplication signals contained within a usable frequency band of a mobile communication terminal.

According to an aspect of the present invention, there is provided an apparatus for removing multiplication signals contained within a usable frequency band during wireless communication in a mobile communication terminal, the apparatus including a multiplier for multiplying a main clock of the mobile communication terminal by a predetermined integer to generate a reference signal; a multiplexer for multiplexing parallel signals, the parallel signals being transmitted to a peripheral device inside the mobile communication terminal, using the reference signal, and converting the parallel signals into serial signals; a demultiplexer for demultiplexing the serial signals to convert the serial signals into parallel signals; and a frequency divider for recovering the reference signal of the serial signals transmitted from the demultiplexer into the main clock.

According to another aspect of the present invention, there is provided a method for removing multiplication signals contained within a usable frequency band during wireless communication in a mobile communication terminal, the method including generating a reference signal by multiplying a main clock of the mobile communication terminal by a predetermined integer when data and control signals are transmitted inside the mobile communication terminal; multiplexing a transmission signal using the reference signal to serially transfer the transmission signal; demultiplexing the serial signals and transmitting the demultiplexed signals to a module in parallel; and recovering the reference signal into the main clock.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. A detail description of well-known features will be omitted for conciseness.

The mobile communication terminal, which will be described below, includes a cellular phone, a Personal Communication System (PCS) terminal, a Personal Data Assistant (PDA), an International Mobile Telecommunication-2000 (IMT-2000) terminal, and the like. A following description will be made with respect to a general construction of the above terminals.

Figure 1:
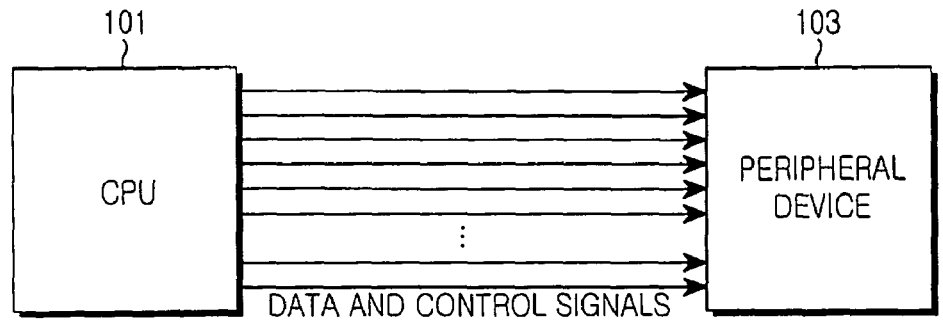
FIG. 1 is a block diagram illustrating transmission of data and control signals between modules in a conventional mobile communication terminal.
Figure 2:
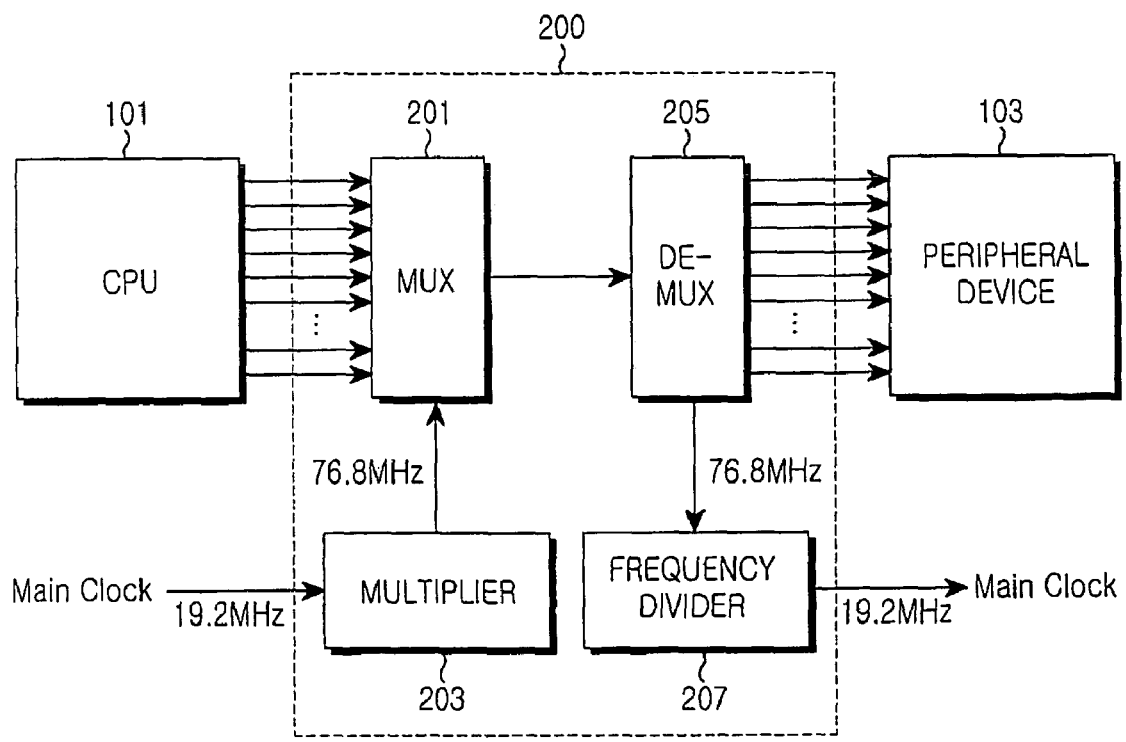
FIG. 2 is a block diagram of an apparatus for eliminating noise contained within a usable frequency band during wireless communication in a mobile communication terminal according to an embodiment of the present invention.

FIG. 2 is a block diagram of an apparatus for eliminating noise contained within a usable frequency band during wireless communication in a mobile communication terminal according to an embodiment of the present invention. It will be assumed that a main clock of a mobile communication terminal is 19.2 MHz.

Referring to FIG. 2, the mobile communication terminal includes a Central Processing Unit (CPU) 101, a serial-to-parallel converter 200, and a peripheral device 103. The CPU 101 transmits data and control signals to the peripheral device (for example, a Liquid Crystal Display (LCD), a camera) in parallel through a predetermined number of buses (generally, sixteen buses). The serial-to-parallel converter 200 includes a multiplexer 201, a multiplier 203, a demultiplexer 205, and a frequency divider 207.

The multiplexer 201 receives the data and control signals that are transmitted from the CPU through the buses in parallel, and converts them into serial data and signals using a reference signal provided from the multiplier 203. The multiplier 203 multiplies its input frequency by integers. In this embodiment, the multiplier 203 multiplies a main clock (=19.2 MHz) of the mobile communication terminal by four and provides the resulting clock (=76.8 MHz) as the reference signal to the multiplexer 201.

Figure 4:
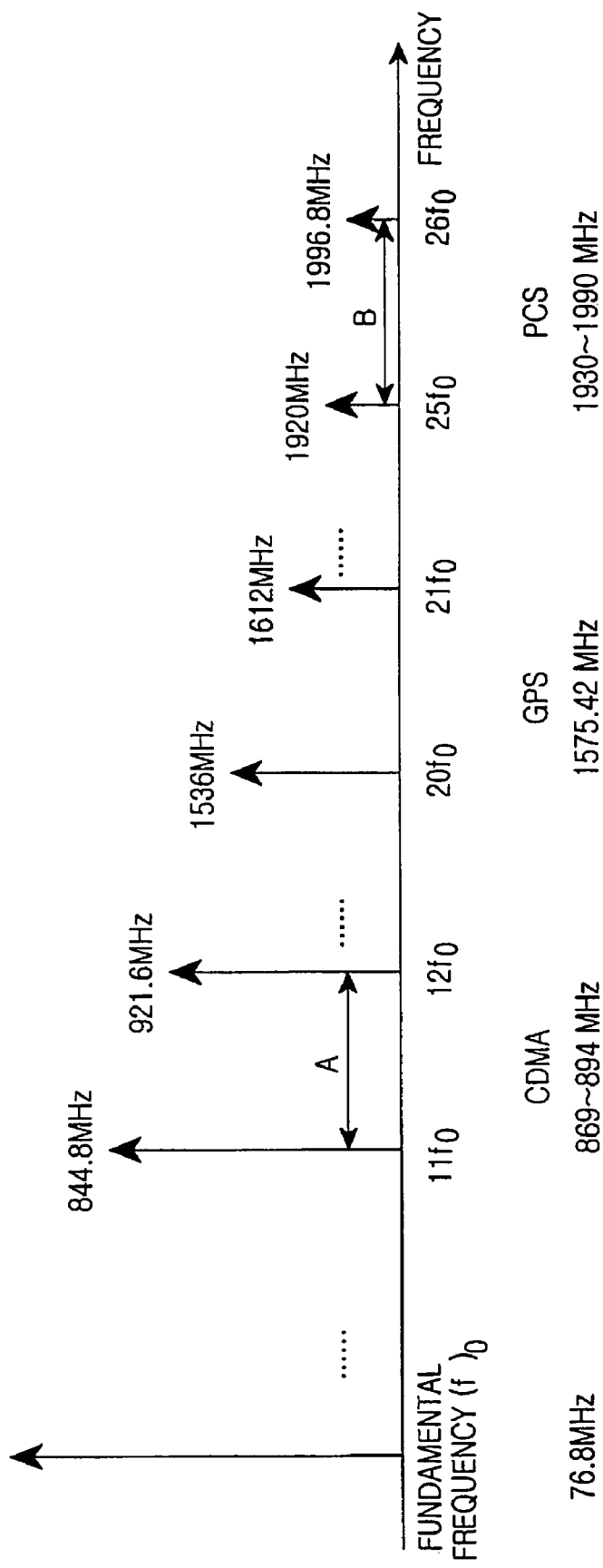
FIG. 4 is a graph illustrating a result showing that no harmonic components are contained within a usable frequency band during wireless communication in a mobile communication terminal.

The reason for multiplying the main clock by four is that if the main clock (=19.2 MHz) is multiplied by less than four, multiplication signals of a transmission signal still remain in section A (a usable frequency band of a CDMA) and section B (a usable frequency band of a PCS) in FIG. 4. Also, if the main clock is multiplied by more than four, there occurs a problem in a data processing capability of the mobile communication terminal. On the contrary, as illustrated in FIG. 4, if the main clock is multiplied by four, multiplication signals do not exist in section A and section B.

The demultiplexer 205 demultiplexes the serial data and signals to convert them into parallel signals, and transfers the transmission signal to the peripheral device 103 in parallel. The frequency divider 207 divides its input frequency signal by n (where n is a positive integer). In this embodiment, the frequency divider 207 divides the reference signal to recover the main clock.

Figure 3:
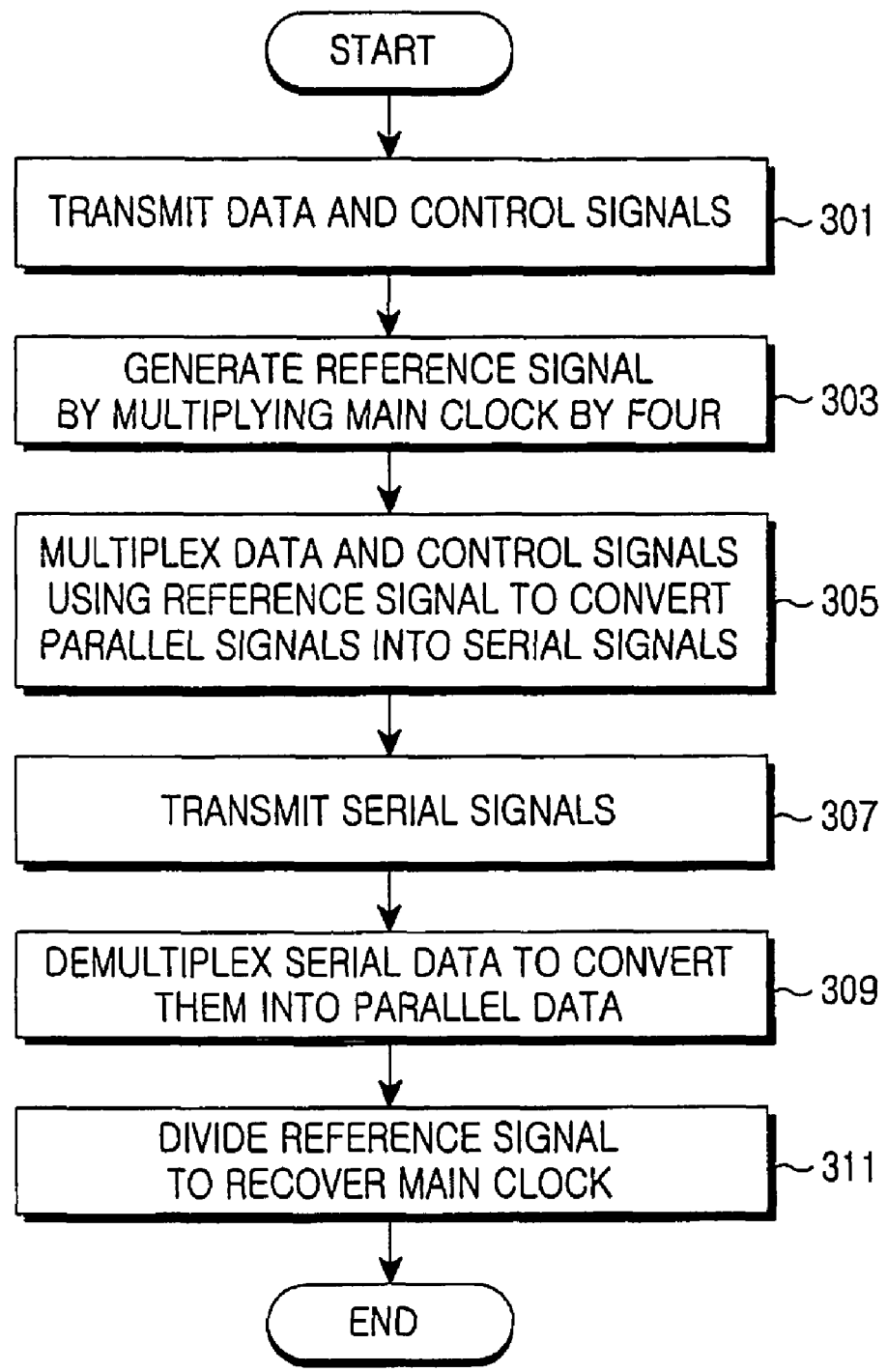
FIG. 3 is a flowchart illustrating a method for eliminating noise contained within a usable frequency band during wireless communication in a mobile communication terminal according to an embodiment of the present invention.

FIG. 3 is a flowchart illustrating a method for eliminating noise contained within a usable frequency band during wireless communication in a mobile communication terminal according to an embodiment of the present invention.

Referring to FIG. 3, in step 301, the CPU 101 transmits data and control signals to the peripheral device 103. The data and control signals are transmitted through a predetermined number of buses (generally, sixteen buses) in parallel. In step 303, the main clock of the mobile communication terminal is multiplied to generate the reference signal for the multiplexer 201. In this embodiment, the multiplier 203 multiplies the main clock (=19.2 MHz) of the mobile communication terminal by four and provides the resulting clock (=76.8 MHz) as the reference signal to the multiplexer 201.

In step 305, the parallel signals are multiplexed using the reference signal and converted into serial signals. In step 307, the serial signals are transmitted. In step 309, the serial signals are demultiplexed and converted into parallel signals, and then the parallel signals are transmitted to the peripheral device.

In step 311, during demultiplexing, the main clock that has been converted into the reference signal in step 303 is recovered and the process ends. That is, because the intervals of the signals that are the multiples of the transmission speed are widened by increasing the transmission speed, the multiplication signals will not be contained within the usable frequency band during wireless communication.

A CDMA and PCS communication will be taken as an example for the description of the removal of the multiplication signals contained in the received signal. It will be assumed that the main clock of the mobile communication terminal is 19.2 MHz and data are transmitted through sixteen buses in parallel fashion at a transmission speed of 3 MHz. Since the mobile communication terminal has the transmission speed of 3 MHz, harmonics that are integer multiples of 3 MHz are generated. Due to the generation of the harmonics, the multiplication signals of the transmission signal are contained in section A and section B in FIG. 4, causing the degradation in the reception performance of the mobile communication terminal.

In order to remove the multiplication signals within the frequency band in the CDMA and PCS communication, if the main clock is multiplied by four and the resulting signal (=76.8 MHz) is used as the reference signal for the multiplexer, parallel signals having a transmission speed of 3 MHz are converted into serial signals having a transmission speed of 76.8 MHz. As illustrated in a section A of FIG. 4, if the signals are transmitted at the transmission speed of 76.8 MHz, a multiplication signal $11f_0$ (where $f_0$ is the reference signal) is 844.8 MHz and a multiplication signal $12f_0$ is 921.6 MHz. Therefore, the multiplication signals are not contained within the usable frequency width (869-894 MHz) of the CDMA system. Also, as illustrated in section B of FIG. 4, a multiplication signal $25f_0$ is 1920 MHz and a multiplication signal $26f_0$ is 1996.8 MHz, so that the multiplication signals are not contained within the usable frequency band (1930-1990 MHz) of the PCS system. Consequently, it is possible to remove noise caused by the multiplication signals within the frequency band during wireless communication in the mobile communication terminal.

As described above, a signal produced by multiplying the main clock by a predetermined number is used as a reference signal to convert the parallel signals into the serial signals. In this manner, it is possible to remove the multiplication signals of the transmission signal contained within the frequency band of the wireless communication. That is, if the multiplication signals contained in the received signal exist within the usable frequency band of the wireless communication, they are recognized as noise. Accordingly, the multiplication signals of the transmission signal can be eliminated from the usable frequency band of the wireless communication by increasing the reference signal through multiplying the main clock, thereby preventing degradation in the reception performance of the mobile communication terminal.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for removing multiplication signals contained within a usable frequency band during wireless communication in a mobile communication terminal, the apparatus comprising:
    a multiplier for multiplying a main clock of the mobile communication terminal by a predetermined integer to generate a reference signal;
    a multiplexer for multiplexing parallel signals using the reference signal, the parallel signals being transmitted to a peripheral device inside the mobile communication terminal, and converting the parallel signals into serial signals;
    a demultiplexer for demultiplexing the serial signals to convert the serial signals into parallel signals; and
    a frequency divider for recovering the reference signal of the serial signals transmitted from the demultiplexer into the main clock.

2. The apparatus of claim 1, wherein the multiplier performs the multiplying operation according to a main clock used in the mobile communication terminal.

3. A method for removing multiplication signals contained within a usable frequency band during wireless communication in a mobile communication terminal, the method comprising the steps of:
    generating a reference signal by multiplying a main clock of the mobile communication terminal by a predetermined integer when data and control signals are transmitted inside the mobile communication terminal;
    multiplexing a transmission signal using the reference signal to serially transfer the transmission signal;
    demultiplexing the serial signals and transmitting the demultiplexed signals to a module in parallel; and
    recovering the reference signal into the main clock.

4. The method of claim 3, wherein the reference signal is generated as an optimum reference signal by multiplying the main clock of the mobile communication terminal by a predetermined integer.

* * * * *